United States Patent [19]

Engler et al.

[11] 4,418,662

[45] Dec. 6, 1983

[54] ENGINE AIR INTAKE FILTER WITH FUMES-ABSORBING SUBSTANCE

[75] Inventors: Walter Engler, Bietigheim-Bissingen; Hans Erdmannsdörfer, Ludwigsburg; Heinz Müller, Remseck; Manfred Wagner, Stuttgart, all of Fed. Rep. of Germany

[73] Assignee: Filterwerk Mann & Hummel GmbH, Ludwigsburg, Fed. Rep. of Germany

[21] Appl. No.: 282,158

[22] Filed: Jul. 10, 1981

[30] Foreign Application Priority Data

Jul. 16, 1980 [DE] Fed. Rep. of Germany ... 8019041[U]

[51] Int. Cl.³ .................... B01D 50/00; F02M 33/02
[52] U.S. Cl. ............................... 123/198 D; 123/518; 55/387; 55/316; 55/515
[58] Field of Search ............... 123/198 D, 518, 519, 123/523; 55/387, 316, 515, 497

[56] References Cited

U.S. PATENT DOCUMENTS

| | | | |
|---|---|---|---|
| 2,589,229 | 3/1952 | Dauphinee | 55/387 |
| 2,825,424 | 3/1958 | Gross | 55/316 |
| 3,261,147 | 7/1966 | Allander | 55/316 |
| 3,430,420 | 3/1969 | Gross | 55/387 |
| 3,477,210 | 11/1969 | Hervent | 123/519 |
| 3,572,014 | 3/1971 | Hansen | 123/519 |
| 3,763,839 | 10/1973 | Alquist | 123/519 |
| 3,831,572 | 8/1974 | Csicsery | 123/519 |
| 3,944,403 | 3/1976 | Simpson et al. | 55/316 |
| 4,015,114 | 3/1977 | Paajanen et al. | 55/316 |
| 4,224,044 | 9/1980 | King | 123/518 |

FOREIGN PATENT DOCUMENTS

| | | |
|---|---|---|
| 1927046 | 5/1969 | Fed. Rep. of Germany . |
| 56-44445 | 4/1981 | Japan ........................ 123/519 |

*Primary Examiner*—Ira S. Lazarus
*Attorney, Agent, or Firm*—Joseph A. Geiger

[57] ABSTRACT

An air intake filter for internal combustion engines designed to prevent the escape of fuel fumes to the atmosphere, the filter cartridge including a rectangular block-shaped filter body folded of filter paper with horizontal top and bottom fold edges, the fold cavities on the downstream side of the cartridge being filled with activated carbon which is retained by a cover layer of fiber fleece. The outer edges of the filter body and of the cover layer are embedded in a resilient sealing collar. The longitudinal extremities of the fold cavities are closed by fold pockets.

6 Claims, 6 Drawing Figures

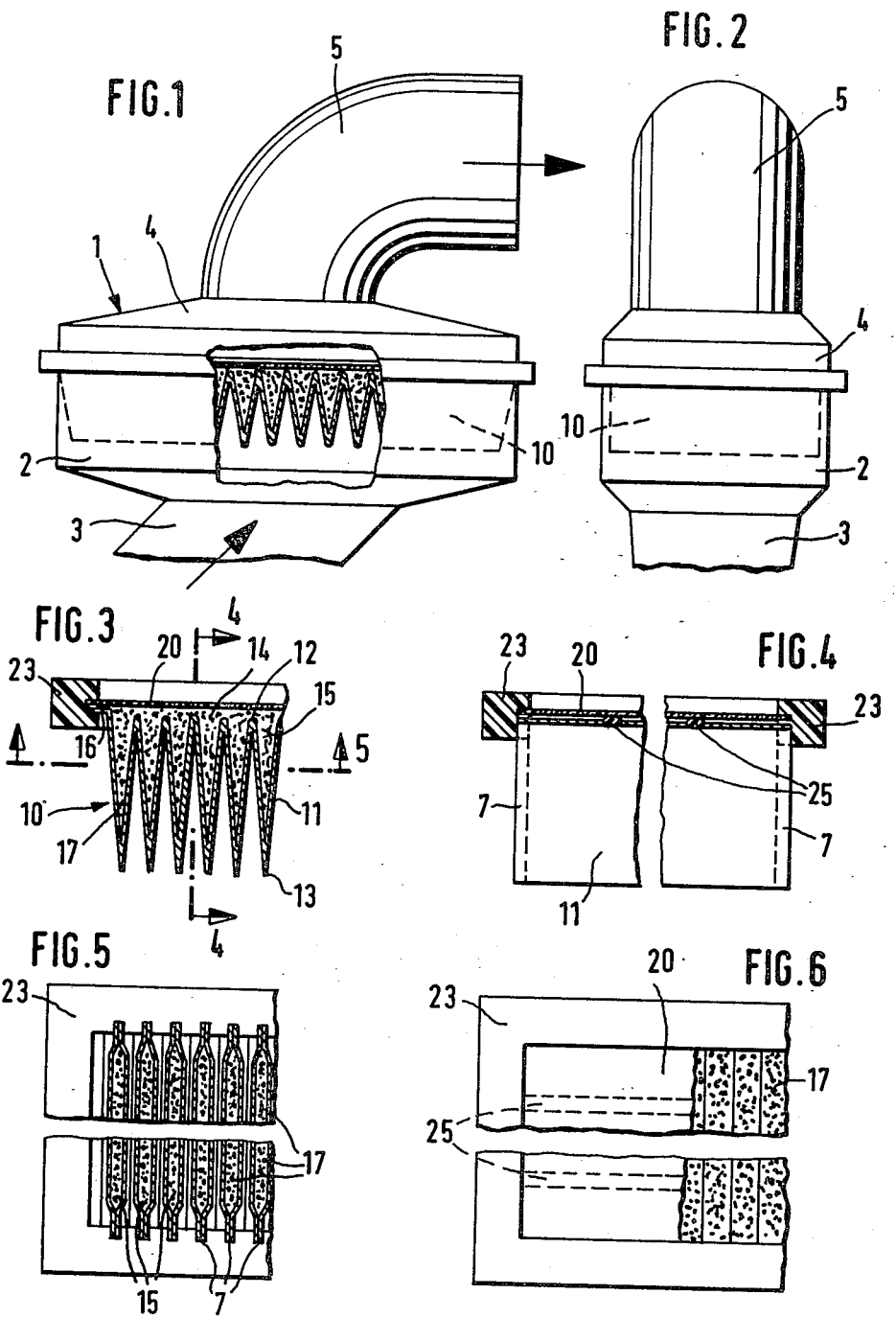

ENGINE AIR INTAKE FILTER WITH FUMES-ABSORBING SUBSTANCE

BACKGROUND OF THE INVENTION

1. Field of the Invention

The present invention relates to air intake filters for internal combustion engines, and, more particularly, to an air intake filter for an internal combustion engine which is designed to prevent the escape of fuel fumes as atmospheric pollutants.

2. Description of the Prior Art

Unburned fuel escaping to the atmosphere in the form of fumes from the fuel supply system of automotive internal combustion engines at standstill is a source of air pollution. A continuous slow discharge of fuel fumes takes place at the fuel tank and a considerable discharge of fumes takes place through the fuel control system and the air intake filter of a hot engine, immediately after shutdown of the engine.

It has already been suggested to prevent these discharges of fuel fumes to the atmosphere by controlling the fumes in such a way that they have to pass through a bed of activated carbon which precipitates and absorbs the fuel fumes. Advantageously, this bed of activated carbon is arranged in the air intake filter itself, so that the fuel which is collected by the activated carbon is drawn back into and consumed by the engine, as soon as it is restarted, thereby automatically regenerating the activated carbon.

For reasons of limited space, automotive internal combustion engines have air intake filters with filter cartridges of low height and comparatively large traverse dimensions. These filter cartridges are either in the shape of a large annulus around a vertical axis, or in the shape of a large plate.

An engine air intake filter with a fumes-absorbing bed of activated carbon is disclosed in the German Offenlegungsschrift (Publ. Appln.) No. 19 27 046, where the air intake filter has an annular filter cartridge with vertical fold edges between which the combustion air enters in a horizontal radial direction. The openings of the wedge-shaped fold cavities on the downstream side of the filter cartridge are covered by means of a fabric cover which is supported by a mesh screen. This screen-supported fabric retains a filling of activated carbon particles in the downstream fold cavities. The publication in question does not disclose how the fold cavities are closed off at their upper and lower extremities.

This prior art filter cartridge has failed to live up to its expectations over extended periods of use. The inevitable presence of vibrations and shocks leads to a settling and packing of the activated carbon in the lower portions of the fold cavities, thereby creating an open flow space above the compacted bed of activated carbon. By thus permitting the fuel fumes to bypass the activated carbon, this prior art filter cartridge largely defeats its purpose. An additional shortcoming of the prior art filter relates to the fact that the assembly of the filter cartridge, especially the introduction of the activated carbon, is somewhat difficult. On the one hand, it is necessary, for the reasons just stated, to fill the fold cavities as completely as possible, on the other hand, the particular configuration of the filter cartridge requires rigid closure members at the axial extremities of the fold cavities, so that the fold cavities must not be over-filled.

SUMMARY OF THE INVENTION

It is a primary objective of the present invention to suggest an improved fumes-absorbing engine air intake filter which, while being simple in structure, is free of the aforementioned shortcomings.

The present invention proposes to attain this objective by suggesting an air intake filter with a filter cartridge which has the overall shape of a rectangular block and which is so arranged inside its filter housing that the fold edges of the filter cartridge are horizontal, or at an inclination of no more than 30° from a horizontal plane, the fold cavities on the upper side of the filter cartridge being filled with activated carbon.

The invention further suggests a simple way of closing off the carbon-containing fold cavities in the longitudinal sense by joining the otherwise diverging filter pleats along vertical edges so as to form closure pockets at both extremities of each fold cavity. These closure pockets, while reinforcing the structure of the filter cartridge, also conveniently serve as attachments for a flexible sealing collar by which the filter cartridge is positioned and clamped inside the filter housing. The vertical edges of the closure pockets are preferably permanently embedded in the flexible plastic material of the sealing collar.

In a further refinement, the present invention suggests for the filter cartridge to include a cover layer of fiber fleece arranged at a short distance above the upper fold edges of the filter cartridge and connected to these edges by at least one transversely oriented bead of adhesive paste. The edges of the supporting cover layer are preferably likewise embedded in the sealing collar.

The proposed novel filter cartridge of rectangular shape has the advantage of being ideally adaptable to different availablities of space for automotive engine air intake filters. The use of a flexible sealing collar as a frame member for the cartridge and as a cartridge mounting member inside the filter housing makes it possible for the latter to have clamping faces that may deviate from precise geometric accuracy. The arrangement of the carbon-filled fold cavities between horizontally oriented fold edges, or fold edges which are inclined by no more than 30°, with a cover layer which is spaced from the upper fold edges and which can yield upwardly, if necessary, makes it possible to fill the fold cavities to a level above the upper fold edges of the cartridge, in addition to tolerating a limited degree of overfilling, thereby safely preventing the opening up of a bypass flow space, if settling takes place in the bed of activated carbon.

The use of a fiber fleece for the cover layer assures a safe retention of the charcoal particles, without grinding them down, while offering a comparatively low flow resistance to the combustion air. Suitable fiber fleeces are available on the market. For filter cartridges with comparatively long fold edges, the vertical bending freedom of the cover layer can be conveniently limited by the application of one or more of the earlier-mentioned beads of adhesive paste between the cover layer and the upper fold edges of the cartridge. Altogether, the structure of the novel filter cartridge is such that it lends itself very well for mass production.

BRIEF DESCRIPTION OF THE DRAWING

Further special features and advantages of the invention will become apparent from the description following below, when taken together with the accompanying drawing which illustrates, by way of example, a preferred embodiment of the invention represented in the various figures as follows:

FIG. 1 is a frontal view of an air intake filter for an internal combustion engine embodying the present invention, portions of the filter housing having been cut away;

FIG. 2 shows the filter of FIG. 1 in a side view;

FIG. 3 shows a portion of the filter cartridge of the invention in an enlarged cross section;

FIG. 4 shows the filter cartridge of FIG. 3 in a longitudinal cross section, taken along line 4—4 of FIG. 3;

FIG. 5 shows the filter cartridge of FIG. 3 in a cross section taken along line 5—5 thereof; and FIG. 6 is a plan view of the filter cartridge of FIGS. 3–5, portions of the cover layer having been removed.

DESCRIPTION OF THE PREFERRED EMBODIMENT

The drawing shows an air intake filter for an internal combustion engine, the filter assembly 1 consisting essentially of a pot-shaped filter housing 2 with an air intake duct 3 connected to its bottom side, the upwardly facing rim of the filter housing 2 carrying a housing cover 4 which is clamped to the housing 2 by means of suitable snap closures which are not shown in the drawing. Cleaned air leaves the filter assembly 1 through a clean air duct 5 in the form of an elbow which is attached to the center of the housing cover 4.

Inside the filter housing is arranged a filter cartridge 10 in the form of a rectangular block, consisting of a length of finely porous filter paper 11 which is folded in a regular zig-zag pattern, with upper fold edges 12 and lower fold edges 13. The wedge-shaped fold cavities 14 on the downstream side of the filter cartridge 10 are closed at their longitudinal extremities 7 by vertical joints of the otherwise upwardly diverging filter paper, so as to form lateral pockets 15, as can be seen in FIG. 5. These downstream fold cavities are filled with activated carbon 17 (FIG. 3) and the carbon filling is covered and retained by means of a cover layer 20 of fiber fleece. The size of the flow passages through the cover layer 20 is considerably larger than the pores of the filter paper 11, but smaller than the particle size of the activated carbon.

The pocket rims 16 and the peripheral margin of the cover layer 20 are embedded in a thick sealing collar 23 of elastically yielding plastic material which thus forms a compressible frame around the block-shaped filter cartridge 10. In the assembled position, the sealing collar 23 is clamped between the filter housing 2 and the housing cover 4, thereby forming a seal and a support for the filter cartridge in the filter assembly 1.

In operation, the combustion air for the internal combustion engine is drawn into the filter housing 2 through its air intake duct 3, flowing upwardly through the pleated filter paper 11 which retains and collects the solid impurities carried by the incoming air. The latter then traverses the layer of activated carbon 7 and the cover layer 20, leaving the filter assembly through its clean air duct 5 in the direction of the internal combustion engine (not shown).

Immediately following the shutdown of the internal combustion engine, there exists a tendency of fuel fumes to flow in opposition to the normal air flow direction, through the clean air duct 5 and through the filter assembly 1. But, as soon as the fumes come in contact with the activated carbon 17 of the filter cartridge 10, they are absorbed by the carbon particles and prevented from being discharged into the atmosphere through the air intake duct 3. Later, when the internal combustion engine is restarted, the incoming combustion air dries up the collected fuel from the activated carbon 17, carrying it into the internal combustion engine and thereby regenerating the bed of activated carbon 17.

The novel structure of the filter cartridge 10 assures that the upper fold edges 12 are always covered by a layer of activated carbon 17, thereby safely preventing the fuel fumes from passing through the filter cartridge by bypassing the activated carbon 17. This is accomplished by initially setting the fill level of activated carbon 17 a small distance above the upper fold edges 12, taking advantage of the upward flexibility of the cover layer 20.

Depending on the horizontal dimensions of the filter cartridge 10 and on the inherent stiffness of the cover layer 20, it may be advantageous to provide intermediate attachment points between the latter and the upper fold edges 12 of the paper pleats. These attachments may take the form of transverse beads of adhesive paste 25, as shown in FIGS. 4 and 6, the paste beads 25 bridging the vertical gap between the cover layer 20 and the fold edges 12.

The preferred orientation of the filter cartridge 10 inside the filter assembly 1 is horizontal. In the embodiment which is shown in the drawing, the filter cartridge 10 "hangs" inside its sealing coller 23, and the incoming combustion air flows upwardly through the filter cartridge 10. Alternatively, it is also possible to arrange the filter assembly in such a way that the cover layer forms the bottom of the filter cartridge, in order to allow for a downwardly directed air flow through the filter cartridge. It is important, in all cases, that the raw air first passes through the filter paper 11, then through the bed of activated carbon 17 and lastly through the cover layer 20.

It should be understood, of course, that the foregoing disclosure describes only a preferred embodiment of the invention and that it is intended to cover all changes and modifications of this example of the invention which fall within the scope of the appended claims.

We claim the following:

1. An air intake filter for use with an internal combustion engine and designed to prevent the escape through the filter of fuel fumes when the engine is at standstill, the filter comprising in combination:

a closed filter housing assembly having a raw air inlet and a clean air outlet; and a filter cartridge partitioning the interior of the filter housing assembly into a raw air space and a clean air space in such a way that the combustion air which flows through the filter is traversing the filter cartridge in a substantially vertical direction;

wherein the filter cartridge comprises:

a block-shaped filter body of zigzag-folded filter paper having fold edges at the top and bottom of the filter body oriented within an angular range of 30° from a horizontal plane and defining generally wedge-shaped fold cavities upstream and downstream of the filter paper;

an air-permeable bed of a granular fuel-absorbant material filling the downstream fold cavities to a level at which the downstream fold edges are submerged a small distance in said bed;

an air permeable cover layer on the downstream side of the fuel-absorbant bed, the cover layer having air passages which are smaller than the fuel-absorbant granules, thereby holding the latter in place; and a sealing collar surrounding the filter body and the cover layer in the manner of a frame, the sealing collar serving to attach the cover layer to the filter body and to position the filter cartridge inside the filter housing assembly.

2. An air intake filter as defined in claim 1, wherein the fuel-absorbant material is activated carbon.

3. An air intake filter as defined in claim 1, wherein
the air-permeable cover layer is a sheet of filter fleece; and
the sealing collar is a collar of compressible flexible plastic material, the marginal edges of the cover layer and marginal portions of the filter body being permanently embedded in the sealing collar.

4. An air intake filter as defined in claim 1, wherein
the downstream fold cavities of the filter body have closure pockets at their longitudinal extremities, the closure pockets being formed by substantially vertically oriented seams at which the marginal edges of the otherwise diverging paper folds of the downstream fold cavities are joined.

5. An air intake filter as defined in any one of claims 1 through 4, wherein
the cover layer is a flexible layer capable of bulging to a limited extent, in order to accommodate slight variations in said-fold-edge submerging fill level of the activated carbon bed; and
the cover layer is locally attached to the submerged fold edges of the filter body by means of at least one transversely oriented bead of adhesive paste.

6. An air intake filter as defined in any one of claims 1 through 4, wherein
the filter housing assembly includes a pot-shaped filter housing with a rectangular rim, defining an upwardly facing opening, and a detachable housing cover with a matching rectangular rim;
the raw air inlet leads into the filter housing, and the clean air outlet is connected to the housing cover, so that the air flows through the filter in an upward direction;
the sealing collar of the filter cartridge is likewise rectangular, being clamped between the rims of the filter housing and housing cover; and
the filter body of the filter cartridge extends downwardly into the filter housing, being carried by the clamped sealing collar.

* * * * *